Jan. 30, 1951     M. I. WILLIAMSON     2,540,068
WIRE HANDLE FOR BOTTLE CARRIERS
Filed March 30, 1949     2 Sheets-Sheet 1

INVENTOR.
Marshall I. Williamson
by Austin Wilhelm + Carlson
per Howard G. Russell
his attorneys.

Jan. 30, 1951 M. I. WILLIAMSON 2,540,068
WIRE HANDLE FOR BOTTLE CARRIERS
Filed March 30, 1949 2 Sheets-Sheet 2

Marshall I. Williamson
INVENTOR.

Patented Jan. 30, 1951

2,540,068

UNITED STATES PATENT OFFICE 2,540,068

WIRE HANDLE FOR BOTTLE CARRIERS

Marshall I. Williamson, New Haven, Conn., assignor to National Folding Box Company, Inc., New Haven, Conn., a corporation of Connecticut Application March 30, 1949, Serial No. 84,340

2 Claims. (Cl. 224—45)

This invention relates to improvements in handles made from a single piece of wire. The invention provides an improved handle which is particularly suited for use with carriers made from sheet material, for example, bottle carriers made from paperboard. The handle embodying the features of this invention is inexpensive, is simple to produce by a few bending operations and performs, in addition to serving as a handle other functions which make it particularly advantageous for carriers of the aforementioned type. The handle embodying the present invention can be used with any form of carrier having a double ply center partition between the two rows of bottles, cans, jars or other articles contained in the pockets or cells of the carrier.

The various features, objects and advantages of the invention will appear more fully from the detailed description which follows accompanied by drawings showing, for the purpose of illustration a preferred embodiment of the invention.

Figure 1:
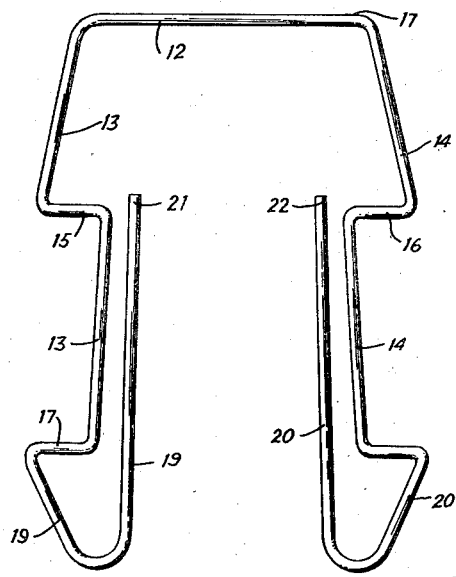
Figure 2:
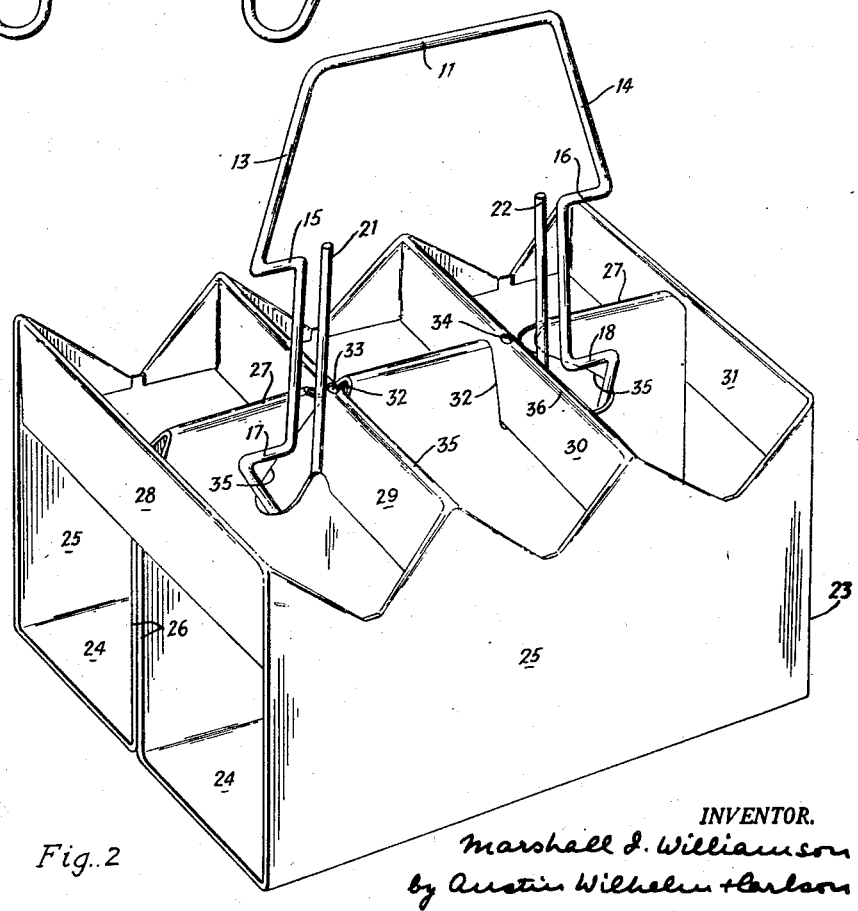
Figure 3:
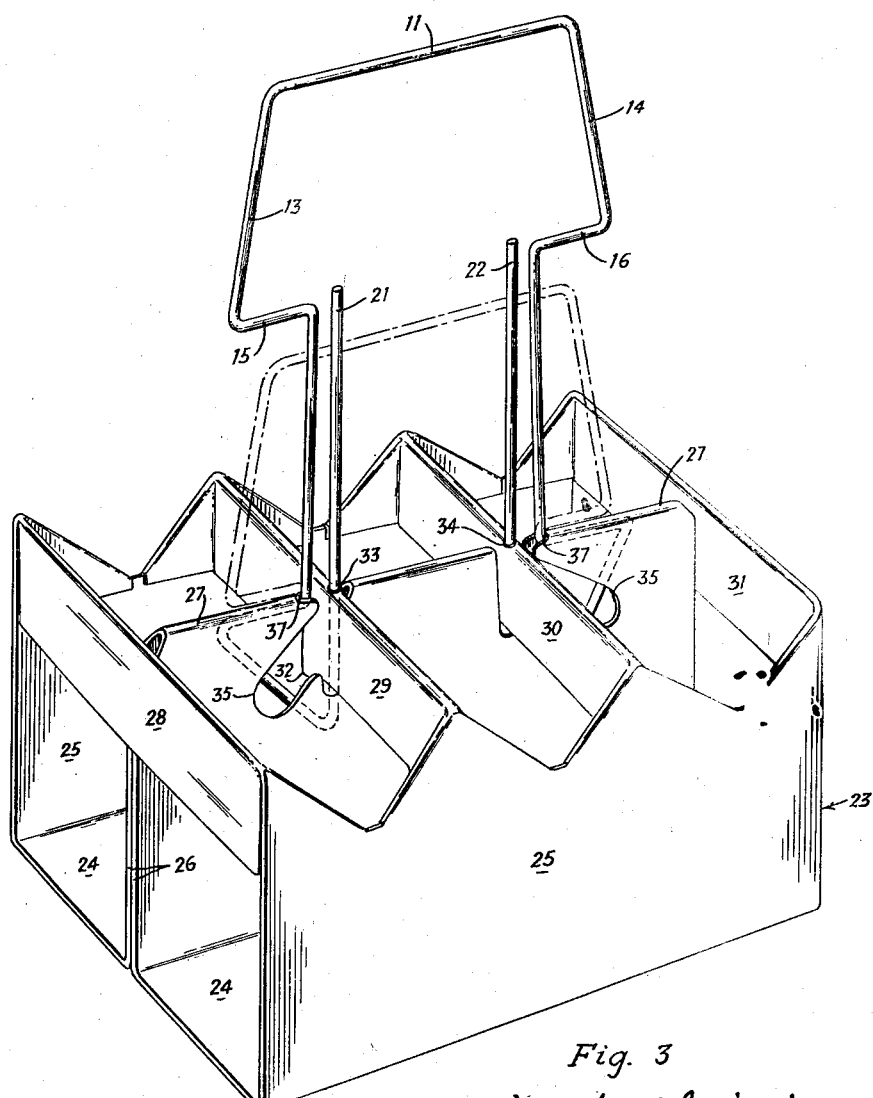

Although the characteristic features of the invention which are believed to be novel will be particularly pointed out in the claims appended hereto, the invention itself, its objects and advantages, and the manner in which it may be carried out may be better understood by referring to description which follows taken in connection with the accompanying drawings forming a part of it in which Figure 1 is a plan view of a handle embodying the present invention;

Figure 2 is a perspective view of a typical carrier body adapted for use in connection with the handle, the illustration showing the wire handle in the process of being inserted; and Figure 3 is a perspective view of the handle and carrier of Figure 2 fully assembled.

In the following description and in the claims various details will be identified by specific names for convenience. The names, however, are intended to be as generic in their application as the art will permit. Corresponding reference characters refer to corresponding parts in the several figures of the drawings.

The handle 11 as shown in Figure 1 is formed by bending a single piece of wire, preferably so that all the portions of the handle lie in one plane. This facilitates packing and storing of the handles and minimizes the likelihood of several handles becoming entangled with one another.

The handle comprises a central grip portion 12 from which a pair of shank portions 13 and 14 extend downwardly. The shank portions 13 and 14 may be offset at 15 and 16 to form an upper pair of shoulders. The purpose of these shoulders will become apparent from the description of the assembled carrier which follows.

A pair of substantially horizontal lower shoulders 17 and 18 extend outwardly from the shank portions 13 and 14, respectively. The lower shoulders 17 and 18 are preferably parallel to the central handle portion 12. End portions 19 and 20 extend from the shoulder portions 17 and 18, first downwardly, and then inwardly and upwardly to lie substantially parallel to the shank portions 13 and 14. The lower parts of the end portions 19 and 20 together with the lower shoulders 17 and 18 resemble triangles in shape, and the upper ends 21 and 22 of the wire preferably, although not necessarily, extend above the upper shoulders 15 and 16 for a purpose which will become apparent hereinafter.

The carrier body 23 shown in Figure 2 comprises bottom panels 24 from which outer wall panels 25 and inner center panels 26 extend upwardly. The inner center panels are folded back upon themselves at a ridge fold line 27.

Connecting webs 28, 29, 30 and 31 extend between the outer wall panel and form six article receiving cells, three cells lying to either side of the center partition 26.

The intermediate connecting webs 29 and 30 intersect the inner center panels 26 which for this purpose have substantially V-shaped notches or indentations 32 cut into them. The intermediate webs 29 and 30 have holes 33 and 34 punched into the ridges at the points of intersection with the center wall panels 26.

The cut away portion of the inner center panels 26 facing the observer is enlarged as shown at 35 to permit insertion of the triangular shaped bottom portion of the handle into the space between the two center panels.

The handle 11 is assembled with the carrier body by inserting its lowermost triangular portion into the apertures produced by the cut 35. During insertion, the upwardly extending end portions 19 and 20 of the handle straddle the intermediate webs 29 and 30, and the handle is held slightly at an angle with respect to the center wall 26. As the handle is being inserted the lower shoulders 17 and 18 first enter the space between the two center panels and thereafter the upper ends 21 and 22 of the wire reach a position underneath the bottom edges of the webs 29 and 30. At this moment the ends 21 and 22 move slightly towards each other by spring action and enter the inside space between the webs 29 and 30 which are of double thickness and are folded back-toback about ridge fold lines 35 and 36. The handle is now pulled upwardly causing the wire ends 21 and 22 to pass through the holes 33 and 34. The handle comes to rest with its lower shoulders 17 and 18 bearing against the ridge fold 27.

It is apparent from Figure 1 that the shanks 13 and 14 of the handle flare slightly downwardly and outwardly. This causes the shanks to be spaced a shorter distance immediately below the upper shoulders 15 and 16 than they are immediately above the lower shoulders 17 and 18. This permits the shanks 13 and 14 to engage two recesses 37 in the center wall when the handle is fully depressed, so that, when the handle is pulled up, the shanks are guided between the center walls 26 by the recesses 37 due to the outward tapering of the shanks.

The handle supports the carrier body at the ridge fold 27 and prevents lateral displacement of the webs 29 and 30 with respect to the center wall 26 by engagement with these webs at the holes 33 and 34.

The handle can be depressed to reduce the total height of the carrier. This is indicated in dash dot lines in Figure 3. When depressed the lower triangular portions of the handle slide downwardly between the two plies of the center panels 26 until the upper shoulders 15 and 16 come to rest on the ridge fold 27. In this position the ends 21 and 22 still extend above the ridge fold line 27 and do not disengage from the holes 33 and 34.

The purpose of the telescoping movement of the handle is to permit the handle to assume a position in which it will not interfere with the stacking of loaded carriers, one on top of the other. It is a practice customary in the beverage industry to stack the carriers so that the bottom of the topmost carrier rests on the tops of the bottles of the carrier directly underneath.

The invention thus provides an improved form of wire handle which serves not only as a mere means for support but also reinforces the carrier body against distortion. The handle is of simple construction, is easily manufactured and permits telescoping with respect to the carrier. It engages the carrier non-hingedly and therefore prevents tilting of the carrier under unevenly distributed loads, for example, if three bottles are contained in the three cells to one side of the partition and none in the others.

What is claimed is:

1. A handle, more particularly for bottle carriers of foldable sheet material, the handle consisting of a wire shaped by bends setting apart the several constituent portions of the handle and comprising, a central substantially horizontal grip portion, a pair of shank portions downwardly extending from said grip portion, a pair of substantially horizontal shoulder portions outwardly extending from said shank portions, and from each other, and a pair of end portions downwardly extending from the other ends of said shoulder portions and then inwardly and upwardly extending to lie inside of the pair of shank portions.

2. A handle, more particularly for bottle carriers of foldable sheet material, the handle consisting of wire shaped by bends setting apart the several constituent portions of the handle all portions lying in the same plane, said portions comprising, a central substantially horizontal grip portion, a pair of shank portions downwardly extending from said grip portion, a pair of oppositely directed substantially horizontal shoulder portions extending from said shank portions, and a pair of end portions extending from said shoulder portions first downwardly then inwardly and upwardly to lie inside of said shank portions, the ends of the terminal portion extending above said shoulder portions.

MARSHALL I. WILLIAMSON.

REFERENCES CITED

The following references are of record in the file of this patent:

UNITED STATES PATENTS

| Number | Name | Date |
|---|---|---|
| 998,729 | Williams | July 25, 1911 |
| 2,407,798 | Ringler | Sept. 17, 1946 |

Certificate of Correction

Patent No. 2,540,068 January 30, 1951

MARSHALL I. WILLIAMSON

It is hereby certified that error appears in the printed specification of the above numbered patent requiring correction as follows:

Column 4, line 17, for the word "other" read *outer*;

and that the said Letters Patent should be read as corrected above, so that the same may conform to the record of the case in the Patent Office.

Signed and sealed this 7th day of August, A. D. 1951.

[SEAL]

THOMAS F. MURPHY,
*Assistant Commissioner of Patents.*